US012755245B2

(12) United States Patent
Chan

(10) Patent No.: US 12,755,245 B2
(45) Date of Patent: Oct. 6, 2026

(54) DISTRIBUTED ORGANIZATIONAL DATA CONSTRUCTION METHOD AND ORGANIZATIONAL DATA CONSTRUCTION BACKEND

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 0 days.

(21) Appl. No.: 18/829,632

(22) Filed: Sep. 10, 2024

(65) Prior Publication Data

US 2025/0086588 A1 Mar. 13, 2025

(30) Foreign Application Priority Data

Sep. 13, 2023 (TW) ................................ 112134779

(51) Int. Cl.
*G06Q 30/00* (2023.01)
*G06Q 10/10* (2023.01)

(52) U.S. Cl.
CPC .................................... *G06Q 10/10* (2013.01)

(58) Field of Classification Search
None
See application file for complete search history.

(56) References Cited

U.S. PATENT DOCUMENTS

2005/0021646 A1* 1/2005 Kumar .................... H04L 67/10 709/206
2009/0222298 A1* 9/2009 Atmaja ................ G06Q 10/067 705/348
2013/0002676 A1* 1/2013 Ziemann ................. G06T 11/20 345/440
2015/0331556 A1* 11/2015 Bernaudin ............. G06Q 10/10 715/810
2016/0378437 A1* 12/2016 Patino-Bueno ...... G06Q 10/067 717/105
2018/0137447 A1* 5/2018 Kaseda ............ G06Q 10/06313

(Continued)

OTHER PUBLICATIONS

Design and Implementation of a Web Based Leave Management System. International Journal of Computer Applications Technology and Research vol. 11-Issue 04, 123-144, 2022, ISSN:-2319-8656 DOI: 10.7753/IJCATR1104.1006. (Year: 2022).*

(Continued)

*Primary Examiner* — Matthew T Sittner
(74) *Attorney, Agent, or Firm* — Muncy, Geissler, Olds & Lowe, P.C.

(57) ABSTRACT

The disclosure describes a distributed organizational data construction method and an organizational data construction backend that can distribute the work of constructing organizational data to be done by a large number of people and make it easy to sign leave request forms. The organizational data construction backend generates an organizational chart and includes: a data module for generating organizational unit data, wherein each of organizational unit data includes one current level field and one superior level field; and a transceiver module for transmitting the organizational unit data to work devices and for receiving the plural filled-in organizational unit data, wherein the plurality of filled-in organizational unit data are transmitted by the work devices; and a matching module for matching the current level fields and the superior level fields of the filled-in organizational unit data to generate an organizational chart.

7 Claims, 5 Drawing Sheets

(56) References Cited

U.S. PATENT DOCUMENTS

| | | | | |
|---|---|---|---|---|
| 2021/0279220 A1* | 9/2021 | Subramaniam | ......... | G06F 16/28 |
| 2023/0169432 A1* | 6/2023 | Todorenko | ................ | G06F 8/34<br>705/7.26 |

OTHER PUBLICATIONS

Design and Implementation of a Web Based Leave Management System. International Journal of Computer Applications Technology and Research vol. 11-Issue 04, 123-144, 2022 (Year: 2022).*

D. O. Knudson, "Obtaining data base management system independence," The IEEE Computer Society's Second International Computer Software and Applications Conference, 1978. COMPSAC '78., Chicago, IL, USA, 1978 (Year: 1978).*

T. A. Gibson and P. F. Stockhausen, "Information Management System: Master links—a hierarchical data system," in The Bell System Technical Journal, vol. 52, No. 10, pp. 1691-1724, Dec. 1973 (Year: 1973).*

* cited by examiner

DISTRIBUTED ORGANIZATIONAL DATA CONSTRUCTION METHOD AND ORGANIZATIONAL DATA CONSTRUCTION BACKEND

BACKGROUND OF THE INVENTION

This application claims priority for the TW patent application no. 112134779 filed on 13 Sep. 2023, the content of which is incorporated by reference in its entirely.

FIELD OF THE INVENTION

The present invention relates to a distributed organizational data construction method and an organizational data construction backend, particularly to a method and a backend using the same that can distribute the work of constructing organizational data to a large number of people and make it easy to sign a leave request form.

DESCRIPTION OF THE RELATED ART

In conventional technology, a company's method for generating an organizational chart typically involved multiple steps and was relatively cumbersome. First, the method usually requires collecting data from various departments, which may have different data formats and structures, thus increasing the complexity of integrating the data. In addition, when a company's organizational structure changes, such as the creation of a new department or the transfer of employees, the conventional method requires manual updating of this information, which often leads to errors and delays.

Furthermore, the organizational structure of larger companies usually involves multiple levels, departments and a large number of employees, which makes drawing and maintaining an organizational chart a very time-consuming and labor-intensive task. In addition, conventional organizational charts often lack flexibility and may face difficulties when they need to be adjusted or reconfigured quickly.

Also, as organizations expand and globalize, the requirements for organizational charts become more complex, making it difficult for conventional methods to meet the needs of rapidly changing organizations. Finally, because conventional approaches typically do not support automated or semi-automated tools and processes, it cannot take full advantage of current technological developments, such as cloud computing, data analytics, and artificial intelligence, to simplify and optimize the generation and maintenance of organizational charts.

In summary, the inconveniences and limitations of conventional methods of generating organizational charts for companies have prompted researchers and engineers to look for more advanced and effective ways to solve these problems.

SUMMARY OF THE INVENTION

The primary objective of the present invention is to provide a distributed organizational data construction method, which allows the work of constructing organizational data to be distributed to a large number of people.

Another objective of the present invention is to provide a distributed organizational data construction method, which can be easy to sign leave request forms.

To achieve the abovementioned objectives, the present invention provides a distributed organizational data construction method, applied to an organizational data construction backend, the distributed organizational data construction method including:

- Step (A): generating a plurality of organizational unit data, wherein each of the plurality of organizational unit data includes one current level field and one superior level field;
- Step (B): transmitting the plurality of organizational unit data to different work devices;
- Step (C): receiving a plurality of filled-in organizational unit data, wherein the plurality of filled-in organizational unit data are transmitted by the plurality of work devices; and
- Step (D): matching the current level fields and the superior level fields in the plurality of filled-in organizational unit data to generate an organizational chart.

The present invention provides an organizational data construction backend for generating an organizational chart, the organizational data construction backend including:

- a data module for generating a plurality of organizational unit data, wherein each of the plurality of organizational unit data includes one current level field and one superior level field;
- a transceiver module for transmitting the plurality of organizational unit data to different work devices and receiving a plurality of filled-in organizational unit data, wherein the plurality of filled-in organizational unit data is transmitted by the plurality of work devices; and
- a matching module for matching the current level fields and the superior level fields in the plurality of filled-in organizational unit data to generate the organizational chart.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementation manners cover the characteristics of a number of specific embodiments and the steps and sequences of the method used to construct and operate these specific embodiments. However, other specific embodiments can also be used to achieve the same or equal functions and sequence of steps.

It should be noted that, unless otherwise specified, all functions described herein may be implemented in hardware or used as software instructions that enable a computer to perform predetermined operations, wherein the software instructions are implemented in a computer-readable storage media, such as a random-access memory (RAM), a hard disk drive, a flash memory, or other types of a computer-readable storage media known to those skilled in the art. In some embodiments, the predetermined operations of the computer are performed by a processor, such as a computer, or performed by program codes such as computer program codes or program codes of software or firmware. In some embodiments, the predetermined operations of the computer are performed by integrated circuits encoded to perform these functions. Furthermore, it should be understood that various operations described herein as being performed by a user may be performed manually by the user, or may be automatically performed with or without instructions provided by the user.

The present invention provides a distributed organizational data construction method and an organizational data construction backend, in particular, a method and a backend using the same that can distribute the work of constructing organizational data to be done by a large number of people and make it easy to sign a leave request form.

Figure 1:
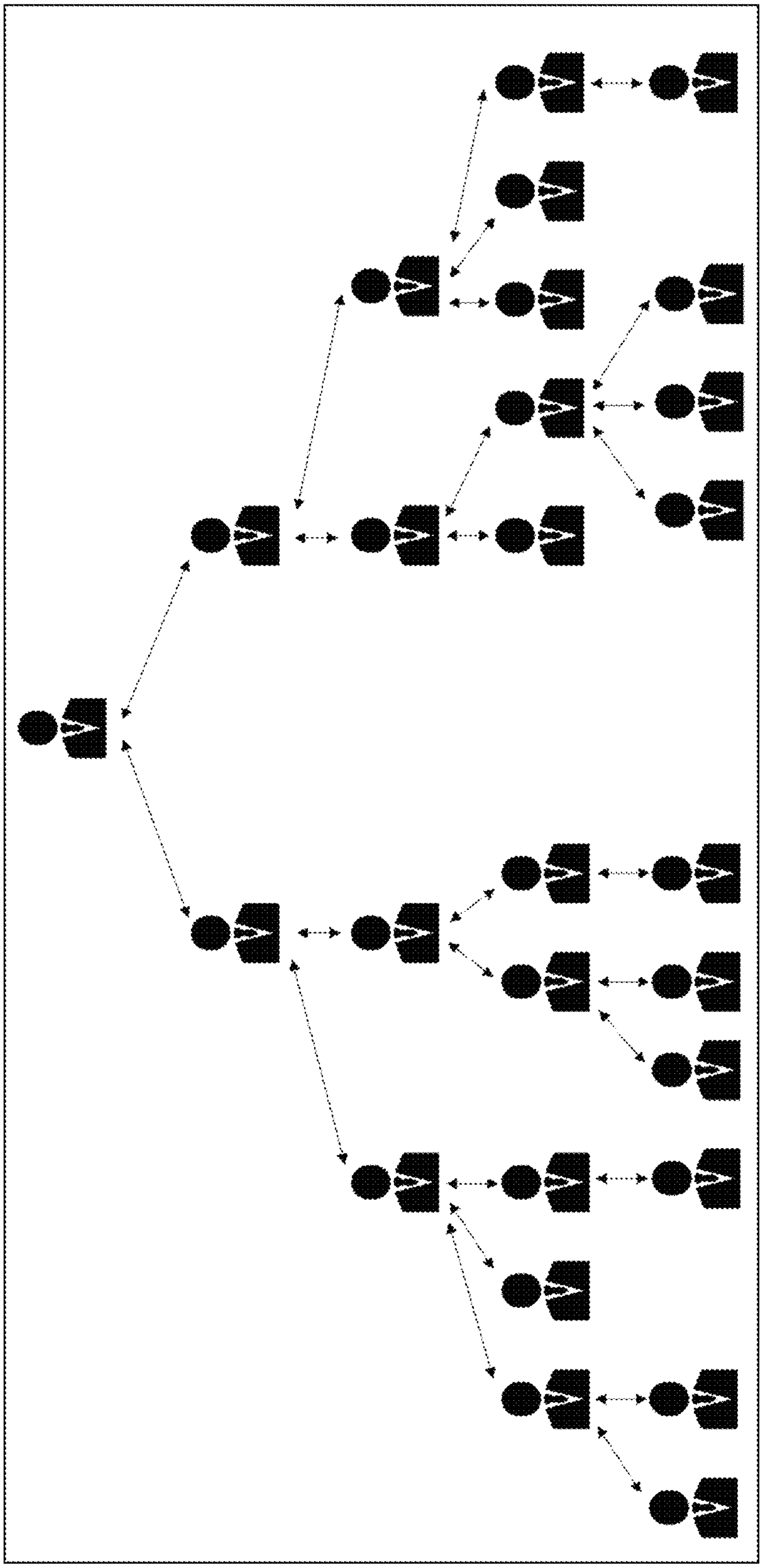
FIG. 1 (Prior Art)
FIG. 1 is a schematic diagram showing the traditional way of constructing organizational data.

FIG. 1 is a schematic diagram showing conventional organizational data construction. As shown in FIG. 1, in a conventional organization, such as a company, there are several or even dozens of hierarchical levels from the top executive to the bottom employee. Each level can be composed of several dozens, hundreds, or even tens of thousands of employees. The most conventional and common way of constructing organizational data is to have one or several human resources department staffs within the company to be responsible for the construction and maintenance. Taking FIG. 1 as an example, the outermost box represents the scope of organizational data that one or several staff members are required to maintain in the conventional method. Therefore, it is conceivable that the larger the company, the more levels, departments, and employees are involved in the organizational structure, which makes drawing and maintaining an organizational chart a very time-consuming and labor-intensive task. In addition, conventional organizational charts often lack flexibility and may face difficulties when they need to be adjusted or reconfigured quickly.

Figure 2:
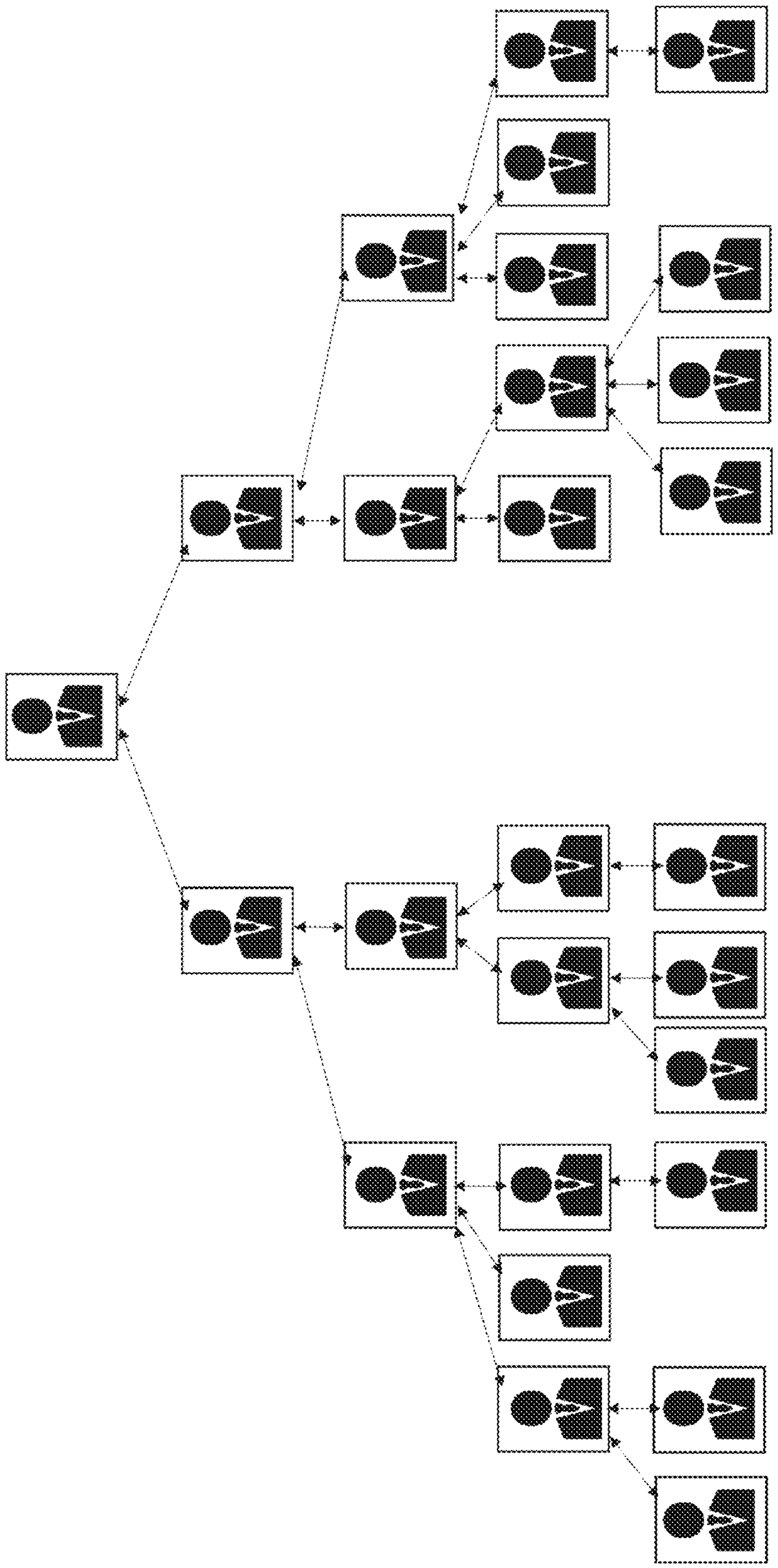
FIG. 2 is a schematic diagram showing the distributed organizational data construction of the present invention.

FIG. 2 is a schematic diagram showing distributed organizational data construction of the present invention. As shown in FIG. 2, the distributed organizational data construction of the present invention assigns the work of organizational data construction to each member of the organization, so that each member only needs to undertake a small portion of the construction work, thereby obtaining all the organizational data of the whole organization. Finally, the complete organizational data can be integrated using the organizational data construction backend, such as outputting an organizational chart. In the example of FIG. 2, each box indicates that each member only needs to assist in inputting his/her own data and other related data (more details later) to complete a small portion of the workload. Then, the input data of each member are integrated to construct the complete organizational data. Comparing the size of the boxes in FIG. 1 with those in FIG. 2, a sense of the difference in workload between the two can be got. In the case of a large enterprise with tens of thousands of employees, the difference in the amount of input data between the two methods is even greater for those responsible for inputting the organizational data.

Figure 3:
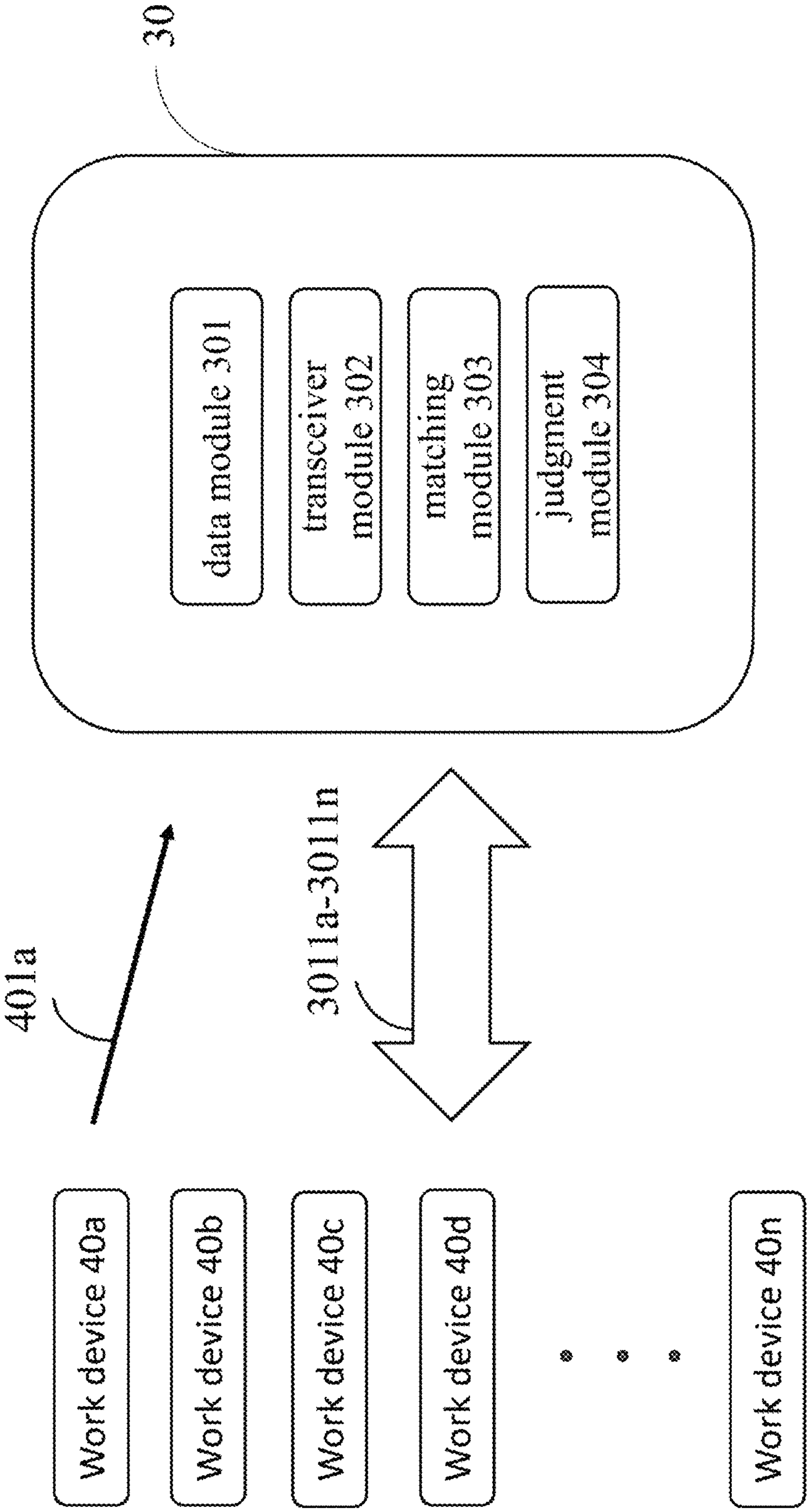
FIG. 3 is a schematic diagram showing the architecture of an organizational data construction backend according to a preferred embodiment of the present invention.
Figure 4:
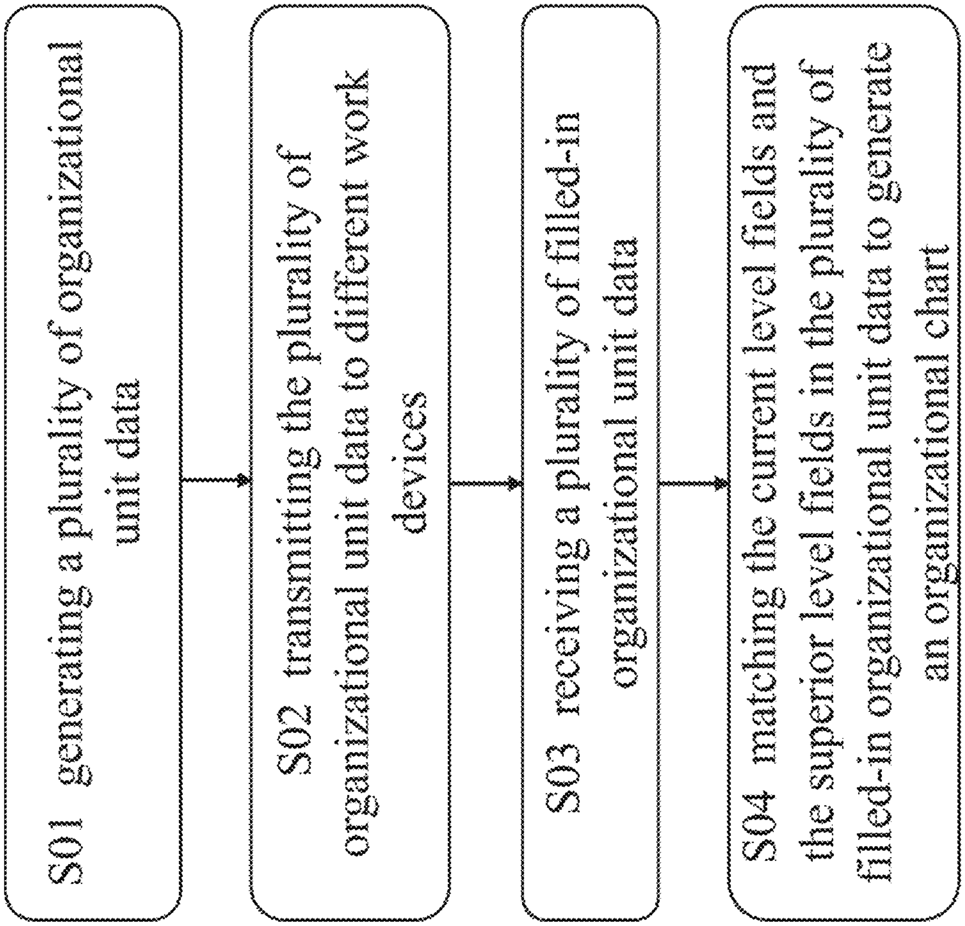
FIG. 4 is a flowchart of a distributed organizational data construction method according to a preferred embodiment of the present invention.

In the following description, please refer to both FIG. 3 and FIG. 4, wherein FIG. 3 is a schematic diagram showing the architecture of an organizational data construction backend according to a preferred embodiment of the present invention. FIG. 4 is a flowchart of a distributed organizational data construction method according to a preferred embodiment of the present invention.

In the application of the present invention, the organizational data construction backend 30 is connected to various work devices 40*a*-40*n* in the company, either directly electrically or via a network. The work devices 40*a*-40*n* may be, for example, mobile devices, laptops, desktop computers, tablets, or smart phones. The organizational data construction backend 30 includes a data module 301, a transceiver module 302, a matching module 303, and a judgment module 304, and the functions of each module are briefly described below. The data module 301 is used to generate plural organizational unit data 3011*a*-3011*n*, wherein each of the organizational unit data includes one current level field and one superior level field. In embodiments of the present invention, either the current level field or the superior level field needs to include one piece of information that can be used to identify an object, such as a work number or a telephone extension number, but the present invention is not limited thereto. For example, in one embodiment of the invention, the current level field contains the name and job number of a filler, and the superior level field contains the name and job number of a superior of the filler. In another embodiment, the current level field contains the name and extension number of a filler, and the superior level field contains the name and extension number of a superior of the filler.

In another embodiment of the present invention, the organizational data construction backend 30 may not be equipped with the data module 301, and the plural organizational unit data 3011*a*-3011*n* may be respectively generated on different plural work devices 40*a*-40*n*. For example, work device 40*a* generates the organizational unit data 3011*a*, work device 40*b* generates the organizational unit data 3011*b*, and work device 40*n* generates the organizational unit data 3011*n*. For example, work device 40*a* generates organizational unit data 3011*a*, work device 40*b* generates organizational unit data 3011*b*, and work device 40*n* generates organizational unit data 3011*n*. After the fillers of work devices 40*a*-40*n* have completed filling in the organizational unit data 3011*a*-3011*n*, the work devices 40*a*-40*n* then transmit the filled-in organizational unit data 3011*a*-3011*n* to the transceiver module 302 of the organizational data construction backend 30.

The transceiver module 302 is used for transmitting the foregoing plural organizational unit data 3011*a*-3011*n* to different plural work devices 40*a*-40*n* and receiving plural filled-in organizational unit data 3011*a*-3011*n*, wherein plural filled-in organizational unit data 3011*a*-3011*n* are transmitted by plural work devices 40*a*-40*n*. For example, work device 40*a* transmits organizational unit data 3011*a*, work device 40*b* transmits organizational unit data 3011*b*, and work device 40*n* transmits organizational unit data 3011*n*. In another embodiment of the present invention described in the foregoing, since the plural organizational unit data 3011*a*-3011*n* are respectively generated on different plural work devices 40*a*-40*n*, the transceiver module 302 does not need to transmit the foregoing plural organizational unit data 3011*a*-3011*n* to the different plural work devices 40*a*-40*n*, but only needs to receive the plural filled-in organizational unit data 3011*a*-3011*n* from the plural work devices 40*a*-40*n*.

The matching module 303 is used to match the current level field and the superior level field of the plural filled-in organizational unit data 3011*a*-3011*n* to generate an organizational chart.

In other embodiments of the present invention, when a work device is called for leave, the transceiver module 302 may receive a leave request form 401*a*, which contains at least the type of leave and the number of days, from a leave requesting work device (e.g., assuming that it is the work device 40*a* that is to be called for leave) that is one of the work devices 40*a*-40*n*. A judgment module 304 is used for transmitting the leave request form 401*a* to at least one superior work device (assuming work device 40*c* is superior to work device 40*a*) that is at least one of the plural work devices 40*a*-40*n* based on leave conditions, wherein the leave conditions comprise a leave type and the number of days. The judgment module 304 determines the number of approval levels required based on the leave type and the number of days, i.e., how many levels of supervisors are required to approve the leave request form. The leave type can include special leave, personal leave, sick leave, bereavement leave, physiological leave, parental leave, etc.; the number of days is the number of days of leave that the filler needs to take; and the number of approval levels is the number of supervisors that need to approve the leave request form.

The following illustrates the flowchart of a distributed organizational data construction method applied to an organizational data construction backend 30 of the present invention. In Step S01, plural organizational unit data 3011*a*-3011*n* are generated, wherein each the organizational unit data includes one current level field and one superior level field. In embodiments of the present invention, either the current level field or the superior level field needs to contain one piece of information that can be used to identify an object, such as a job number or a telephone extension number, but the present invention is not limited thereto.

In Step S02, plural organizational unit data 3011*a*-3011*n* are transmitted to different plural work devices 40*a*-40*n*, and each work device receives an organizational unit data for filling in, such as transmitting organizational unit data 3011*a* to work device 40*a*, transmitting organizational unit data 3011*b* to work device 40*b*, and transmitting organizational unit data 3011*n* to work device 40*n* and so on. In Step S03, the plural filled-in organizational unit data 3011*a*-3011*n* are received, wherein plural filled-in organizational unit data 3011*a*-3011*n* are transmitted by plural work devices 40*a*-40*n*. In Step S04, the current level field and the superior level field in the plural filled-in organizational unit data 3011*a*-3011*n* are matched to generate an organizational chart (not shown). For example, the current level field contains the name and the job number of a filler, and the superior level field contains the name and the job number of the superior of the filler. The job number or the telephone extension number of each employee in a company organization is unique, and thus can be used to identify an object. Therefore, it can be used as identifying information for the target person.

After the organizational data construction backend 30 receives the plural filled-in organizational unit data 3011*a*-3011*n* from the plural work devices 40*a*-40*n*, it may, in the matching procedure, use any of the organizational unit data as the starting organizational unit data, and search for the second organizational unit data that contains the work number or telephone extension number in the superior level field of the starting organizational unit data (because it is unique). Search for the second organizational unit data which contains the work number or telephone extension number in this level of field, i.e. the matching of the starting organizational unit data with the second organizational unit data is completed (it should be understood that the filler of the second organizational unit data is the supervisor of the filler of the starting organizational unit data). Then, the job number or telephone extension number in the superior level field of the second organizational unit data is used to search for the third organizational unit data that contains the job number or telephone extension number in the current level field, i.e., the matching of the second organizational unit data with the third organizational unit data is completed. When all the organization unit data 3011*a*-3011*n* have gone through the matching process and found the organizational unit data of the superior level or current level, an organizational chart will be generated.

It should be understood that, in another embodiment of the present invention, the organizational data construction backend 30 may not be equipped with the data module 301. The plural organizational unit data 3011*a*-3011*n* may be generated by the plural work devices 40*a*-40*n* and filled in by the respective fillers, and then the work devices 40*a*-40*n* transmit the filled-in organizational unit data 3011*a*-3011*n* to the transceiver module 302 of the organizational data construction backend 30. The work devices 40*a*-40*n* then transmit the filled-in organizational unit data 3011*a*-3011*n* to the transceiver module 302 of the organizational data construction backend 30. Therefore, in another embodiment of the present invention in which the data module 301 is not provided, the above-described distributed method of constructing organizational data may omit Step S01 and Step S02.

Figure 5:
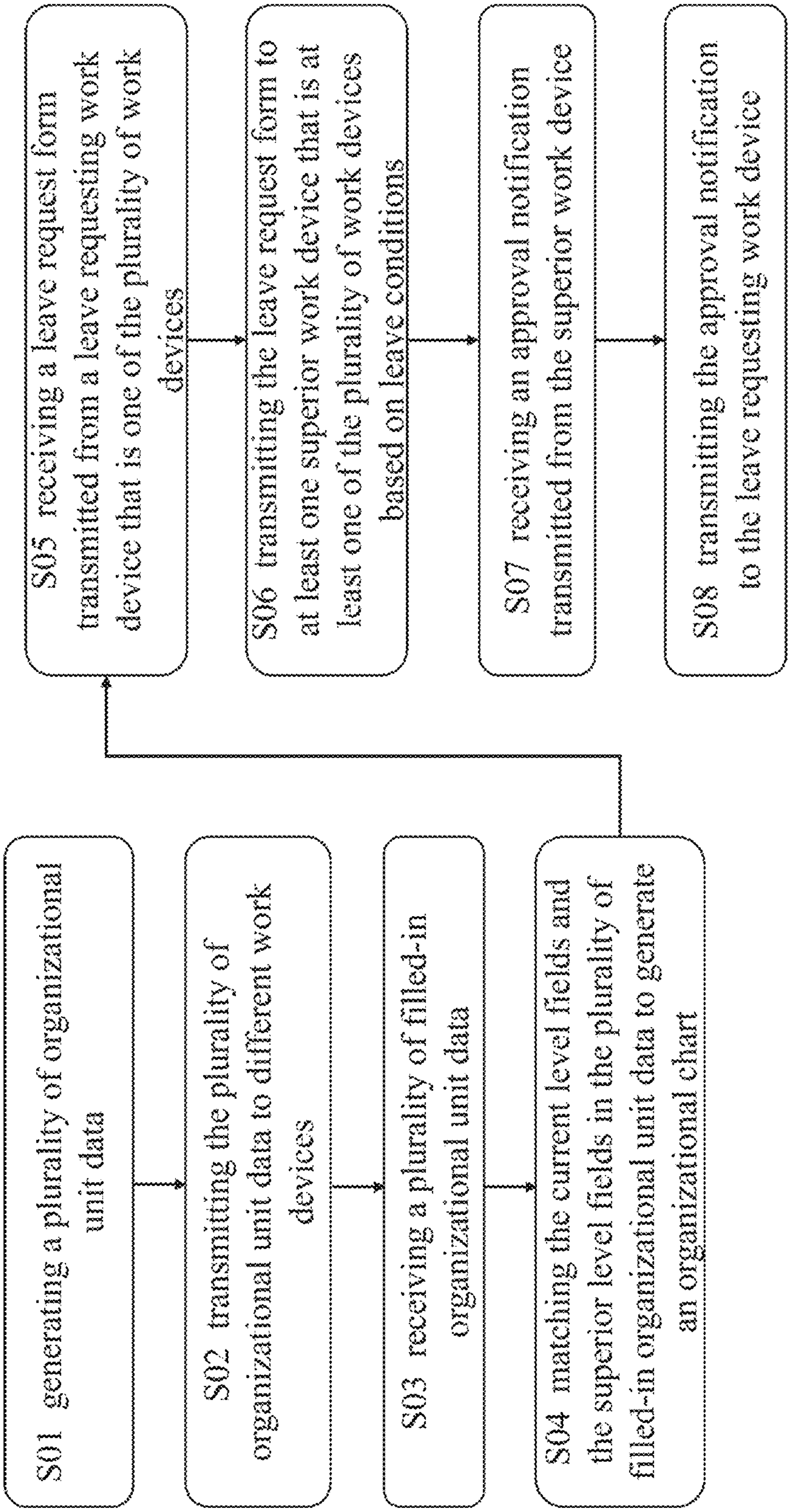
FIG. 5 is a flowchart of a distributed organizational data construction method according to another preferred embodiment of the present invention.

FIG. 5 is a flowchart of a distributed organizational data construction method according to another preferred embodiment of the present invention. FIG. 5 includes steps related to a work device leave request. Steps S01-S04 are the same as those in FIG. 4 and are not repeated here. In Step S05, a leave request form 401*a* is received from a leave requesting work device that is one of the plural work devices 40*a*-40*n* (assuming that work device 40*a* is to request leave). In Step S06, the leave request form 401*a* is transmitted to at least one superior work device that is at least one of the plural work devices 40*a*-40*n* (assuming that work device 40*c* is a superior work device of work device 40*a*) based on leave conditions, where the leave conditions contain a leave type and the number of days. The judgment module 304 in the organizational data construction backend 30 determines the number of approval levels required based on the number of days and the leave type. For example, if the leave type on the leave request form is special leave and the number of days is 1 day, the number of approval levels required is determined to be 1. Therefore, in Step S06, the leave request form 401*a* will be sent to a superior work device (need 1 approval level) of the work device 40*a*, i.e., the work device 40*c*. For example, if the leave type on the leave request form is parental leave and the number of days is 60, the number of approval levels required is determined to be 2. Therefore, in Step S06, the leave request form 401*a* will be sent to the superior work device of the work device 40*a*, i.e., the work device 40*c*. When the work device 40*c* has approved the leave request form 401*a*, it further transmits the leave request form 401*a* to the superior work device of the work device 40*c* (need 2 approval level), assuming the work device 40*d*.

In Step S07, one approval notification transmitted by a superior work device is received. As described in the preceding embodiment, when the number of approval levels required is determined to be 1, the leave request form 401*a* is transmitted to a superior work device of the work device 40*a*, i.e., the work device 40*c*. After the work device 40*c* has approved the leave request form of the work device 40*a*, the organizational data construction backend 30 receives an approval notification transmitted from the superior work device (i.e., the work device 40*c*).

In Step S08, an approval notification is sent to the leave requesting work device. In order to let the leave requesting work device know whether the process of leave request has been completed or not, therefore, the organizational data construction backend 30 will transmit the approval notification to the leave requesting work device after receiving the approval notification sent by the superior work device.

As can be understood from the above description, the distributed organizational data construction method and the organizational data construction backend of the present invention can distribute the work of constructing organizational data to be done by a large number of people, in order to avoid the conventional situation where only a small number of people within the company are responsible for the construction and maintenance, which would make the completion of the organizational chart a very time-consuming and laborious work. The present invention also overcomes the fact that when there is a need for quick adjustments or reconfiguration, maintaining the organizational chart by a few people only may lead to a situation where quick adjustments are not possible. In addition, the organizational unit data of the present invention contains one current level field and one superior level field, so it is easy to know who the supervisor of the employee in current level field is (i.e., the data in the superior level field). Therefore, no matter how many levels are required to approve the leave request form, it is possible to quickly look up to the supervisor one level at a time and to approve the leave request form upward one level at a time.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A distributed organizational data construction method, applied to an organizational data construction backend, the distributed organizational data construction method comprising:

Step (A): generating a plurality of organizational unit data, wherein each of the plurality of organizational unit data comprises one current level field and one superior level field, and wherein each of the current level field and the superior level field stores a unique identifier that exclusively identifies a specific individual within the organization, the unique identifier comprising at least one of a job number or a telephone extension number assigned exclusively to that individual;

Step (B): transmitting the plurality of organizational unit data to different work devices;

Step (C): receiving a plurality of filled-in organizational unit data, wherein the plurality of filled-in organizational unit data are transmitted by the plurality of work devices;

Step (D): matching the current level fields and the superior level fields in the plurality of filled-in organizational unit data to generate an organizational chart, wherein the matching is performed by the organizational data construction backend executing an iterative search algorithm in which: (i) the unique identifier stored in the superior level field of a first filled-in organizational unit data is extracted; (ii) all received filled-in organizational unit data are searched to identify a second filled-in organizational unit data whose current level field stores the same unique identifier; (iii) a hierarchical parent-child linkage is established between the first and second filled-in organizational unit data; and (iv) steps (i) through (iii) are iterated for all filled-in organizational unit data until all hierarchical linkages are established and the organizational chart is generated as a hierarchical data structure stored in a memory of the organizational data construction backend;

Step (E): receiving a leave request form transmitted from a leave requesting work device that is one of the plurality of work devices; and Step (F): transmitting the leave request form to at least one superior work device that is at least one of the plurality of work devices based on leave conditions, wherein the leave conditions comprise a leave type and number of days and the server determines, based on the leave type and the number of days, a number of approval levels required, and transmits the leave request to corresponding superior work devices of the number of approval levels, wherein the organizational data construction backend determines the superior work devices by traversing the hierarchical parent-child linkages of the organizational chart stored in the memory, starting from a node corresponding to the leave requesting work device and traversing upward through the hierarchical linkages for the determined number of approval levels, without human identification of the routing path.

2. The method of claim 1, wherein the current level field comprises a name and a job number of a filler, and the superior level field comprises a name and a job number of a superior of the filler.

3. The method of claim 1, wherein the current level field comprises a name and a telephone extension number of a filler, and the superior level field comprises a name and a telephone extension number of a superior of the filler.

4. The method of claim 1, further comprising:

Step (G): receiving an approval notification transmitted from the superior work device; and Step (H): transmitting the approval notification to the leave requesting work device.

5. An organizational data construction backend for generating an organizational chart, the organizational data construction backend comprising a processor and a non-transitory computer-readable memory storing computer-executable instructions that, when executed by the processor, cause the processor to implement:

a data module implemented in the processor for generating a plurality of organizational unit data, wherein each of the plurality of organizational unit data comprises one current level field and one superior level field, and wherein each of the current level field and the superior level field stores a unique identifier that exclusively identifies a specific individual within the organization, the unique identifier comprising at least one of a job number or a telephone extension number assigned exclusively to that individual;

a transceiver module implemented in the processor for transmitting the plurality of organizational unit data to different work devices and receiving a plurality of filled-in organizational unit data, wherein the plurality of filled-in organizational unit data is transmitted by the plurality of work devices; and a matching module implemented in the processor and configured to match the current level fields and the superior level fields in the plurality of filled-in organizational unit data to generate the organizational chart, wherein the matching module is configured to execute an iterative search algorithm in which: (i) the unique identifier stored in the superior level field of a first filled-in organizational unit data is extracted; (ii) all received filled-in organizational unit data are searched to identify a second filled-in organizational unit data whose current level field stores the same unique identifier; (iii) a hierarchical parent-child linkage is established between the first and second filled-in organizational unit data; and (iv) steps (i) through (iii) are iterated for all filled-in organizational unit data until all hierarchical linkages are established and the organizational chart is generated as a hierarchical data structure stored in the memory;

wherein the transceiver module further configured for receiving a leave request form transmitted from a leave requesting work device that is one of the plurality of work devices; and wherein a judgment module implemented in the processor and configured to transmit the leave request form to at least one superior work device that is at least one of the plurality of work devices based on leave conditions, wherein the leave conditions comprise a leave type and a number of days, and the judgment module determines, based on the leave type and the number of days, a number of approval levels required, and transmits the leave request to corresponding superior work devices of the number of approval levels, wherein the judgment module determines the superior work devices by traversing the hierarchical parent-child linkages of the organizational chart stored in the memory, starting from a node corresponding to the leave requesting work device and traversing upward through the hierarchical linkages for the determined number of approval levels, without human identification of the routing path.

6. The organizational data construction backend of claim 5, wherein the current level field comprises a name and a job number of a filler, and the superior level field comprises a name and a job number of a superior of the filler.

7. The organizational data construction backend of claim 5, wherein the current level field comprises a name and a telephone extension number of a filler, and the superior level field comprises a name and a telephone extension number of a superior of the filler.

* * * * *